United States Patent
Tanzer et al.

(10) Patent No.: US 6,603,657 B2
(45) Date of Patent: Aug. 5, 2003

(54) SYSTEMS FOR MOUNTING DATA STORAGE DEVICES

(75) Inventors: Herbert J. Tanzer, Folsom, CA (US); Brian Tsuyuki, Roseville, CA (US); Richard B. Nelson, Granite Bay, CA (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/896,478

(22) Filed: Jun. 29, 2001

(65) Prior Publication Data

US 2003/0011979 A1 Jan. 16, 2003

(51) Int. Cl.[7] .............................. H05K 5/00; H05K 7/14
(52) U.S. Cl. .................. 361/685; 361/730; 361/732; 361/759; 361/798; 361/800; 361/801
(58) Field of Search ................................ 361/683–686, 361/728–730, 752, 753, 759, 796, 797, 798, 800, 801, 816, 818, 732; 211/41.17

(56) References Cited

U.S. PATENT DOCUMENTS

| | | | |
|---|---|---|---|
| 3,697,084 A | 10/1972 | Ban | 274/4 F |
| 3,959,823 A | 5/1976 | Heidecker et al. | 360/99 |
| 3,964,098 A | 6/1976 | Kramer et al. | 360/93 |
| 4,062,049 A | 12/1977 | Dirks | 360/78 |
| 4,194,224 A | 3/1980 | Grapes et al. | 360/97 |
| 4,349,850 A | 9/1982 | Harvey | 360/74.2 |
| 4,359,762 A | 11/1982 | Stollorz | 360/98 |
| 4,413,328 A | 11/1983 | Videki, II | 364/900 |
| 4,633,350 A | 12/1986 | Hanson | 360/98 |
| 4,821,146 A | * 4/1989 | Behrens et al. | 361/692 |
| 4,912,580 A | 3/1990 | Hanson | 360/98.01 |
| 5,122,914 A | 6/1992 | Hanson | 360/98.01 |
| 5,162,980 A | 11/1992 | Morgan et al. | |
| 5,323,298 A | 6/1994 | Shata et al. | |
| 5,327,308 A | 7/1994 | Hanson | 360/97.01 |
| 5,515,215 A | 5/1996 | Hanson | 360/98.01 |
| 5,517,373 A | 5/1996 | Hanson | 360/98.01 |
| 5,563,748 A | 10/1996 | Hanson | 360/97.01 |
| 5,602,696 A | 2/1997 | Hanson | 360/97.01 |
| 5,682,277 A | 10/1997 | Hanson | 360/97.01 |
| 5,764,434 A | 6/1998 | Hanson | 360/97.01 |
| 5,828,546 A | * 10/1998 | Tirrell et al. | 361/685 |
| 5,883,757 A | 3/1999 | Hanson | 360/97.01 |
| 6,091,571 A | 7/2000 | Hanson | 360/98.04 |
| 6,095,862 A | 8/2000 | Doye et al. | |
| 6,097,567 A | 8/2000 | Hanson | 360/97.01 |
| 6,188,576 B1 | 2/2001 | Ali et al. | |

FOREIGN PATENT DOCUMENTS

| | | |
|---|---|---|
| GB | 808848 | 2/1956 |
| JP | 50-97454 | 8/1975 |
| JP | 57-94687 | 12/1980 |

OTHER PUBLICATIONS

Photographs (copies): 1) Compaq ProLiant; 2) Dell PowerEdge; 3) HP NetServer; 4) IBM Netfinity 1"; 5) IBM Netfinity 1.6" 6) Sun Ultra Enterprises; 7) HP Disk Array 1994; 8) Trimm Technology 1997; 9) Xyratex Salient Drive Carrier 1997; 10) Symbios 1998; 11) HP Disk Array 1995; 12) DEC Storage Works 1994; 13) HP NetServer LX Pro 1998; 9 pps.

(List continued on next page.)

Primary Examiner—Jayprakash N. Gandhi

(57) ABSTRACT

Data storage systems are provided. Preferably, a data storage system includes a chassis and a carrier. The chassis is configured to mount at least one data storage device. The carrier incorporates a housing and a handle assembly. The housing is configured to receive at least a portion of a data storage device. The handle assembly includes a handle that facilitates secure mounting of the carrier to the chassis and removal of the carrier from the chassis. Other systems and devices also are provided.

24 Claims, 10 Drawing Sheets

OTHER PUBLICATIONS

Photograph (copy): Dataflux Rugged Winchester, 5800R "Twi nchesters", Signal, 10/82, p. 102.

"Hard Facts About The ROLM Military Hard Disk," Defense Electronics, 10/52, p. 32.

Dataflux disc drives make the grade. Again; Signal, Oct. 1982, p. 102.

Micro–Winchester subsystem is Multibus–compatible, Mini–MicroWorld; Mini–Micro Systems, Jun. 1981, p. 33.

Mil–Spec, From The Ground Up; Signal, Oct., 1982, 3 pps.

Only Miltope flexible disk drives meet the tough standards of the toughest business of them all; Defense Electronics, Mar. 1981, p. 41.

Calendar, Defense Electronics, Dec. 1962, pp. 51–52.

ASF Pluggable Design, F. Dibble, W.L. Jaskiew icz, W.C. Miller and R.E. Weber; IBM Technical Disclosure Bulletin, vol. 24, No. 1A, Jun. 1981, IBM Corp. 1981, p. 28.

Low–Cost, Rack–Mounted, Direct–Access Disk Storage Device, W.P. Bakkan, R.C. Lentz, F.C. Pexton and J.R. Reidenbach, IBM Technical Disclosure Bulletin, vol. 19, No. 10, Mar. 1977, IBM Corp. 1977.

U.S. patent application Ser. No. 09/809,409 (10012052–1, 50918–1490), entitled "Systems with Enhanced Electrostatic Discharge Protection," filed on Mar. 15, 2001.

* cited by examiner

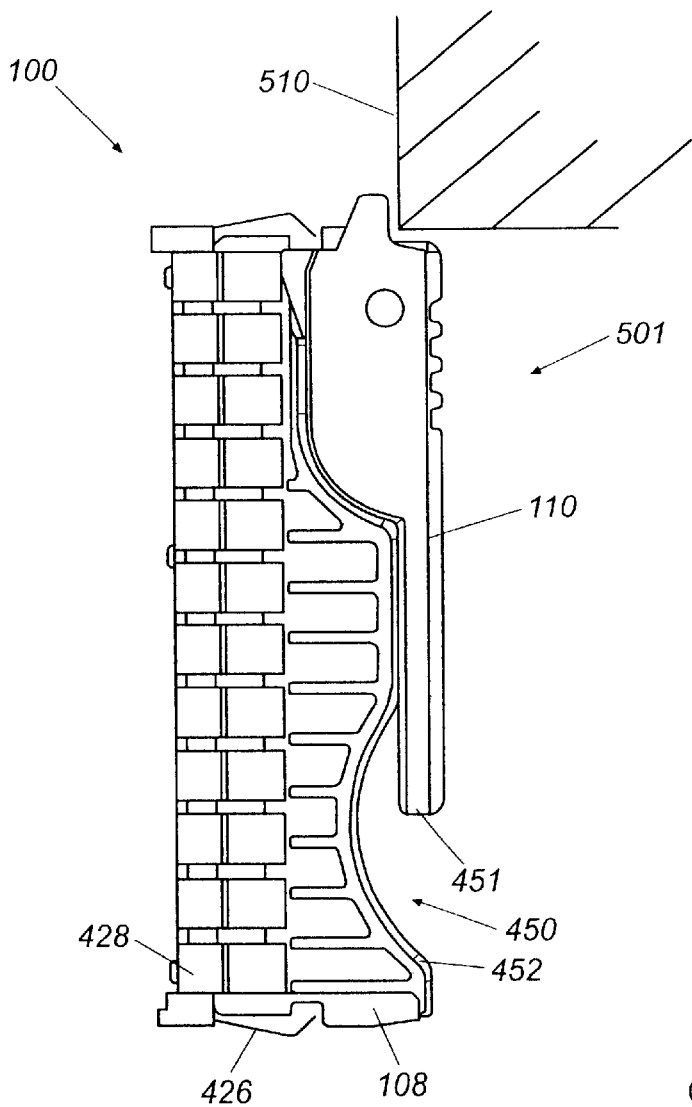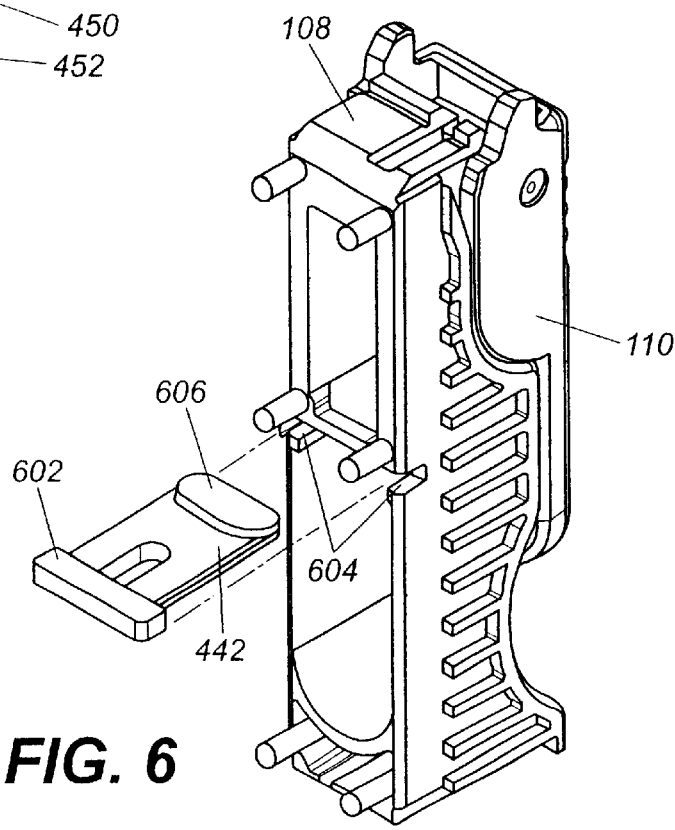
FIG. 5
FIG. 6

SYSTEMS FOR MOUNTING DATA STORAGE DEVICES

BACKGROUND OF THE INVENTION

1. Field of the Invention

The present invention generally relates to data storage. More specifically, the invention relates to systems for mounting data storage devices, such as disk drives, for example.

2. Description of the Related Art

Numerous storage medium carriers, such as disk drive carriers, for example, exist in the computer industry. Typically, each of these carriers is configured to fulfill a particular need. By way of example, a particular disk drive carrier may be adapted to mount an associated disk drive to an enclosure, such as a server product. In contrast, another disk drive carrier may be adapted to facilitate mounting of an associated disk drive to a disk array. However, storage medium carriers have substantially failed to incorporate designs that are able to adequately protect associated storage media, while providing mounting adaptability of the storage media between various mounting platforms. Therefore, there is a need for improved devices, systems, and methods that address these and/or other shortcomings of the prior art.

SUMMARY OF THE INVENTION

The present invention relates to data storage. In this regard, embodiments of the invention may be construed as providing systems for mounting a data storage device to a chassis. A preferred embodiment includes a carrier that incorporates a housing and a handle assembly. The housing is configured to receive at least a portion of a data storage device. The handle assembly includes a handle that is configured to move between a latched position and an unlatched position. In the latched position, the handle facilitates secure mounting of the carrier to a chassis. In the unlatched position, the handle facilitates removal of the carrier from the chassis.

Other embodiments of the invention may be construed as providing data storage systems. A preferred embodiment includes a chassis and a carrier. The chassis is configured to mount at least one data storage device. The carrier incorporates a housing and a handle assembly. The housing is configured to receive at least a portion of a data storage device. The handle assembly includes a handle that facilitates secure mounting of the carrier to the chassis and removal of the carrier from the chassis.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

FIG. 5 is a cut-away, side view of the embodiment of the carrier depicted in FIG. 1.

FIG. 6 is a partially exploded, perspective, rear view of the bezel of the carrier depicted in FIG. 1, showing assembly detail of the thumb latch.

DETAILED DESCRIPTION OF A PREFERRED EMBODIMENT

Figure 1:
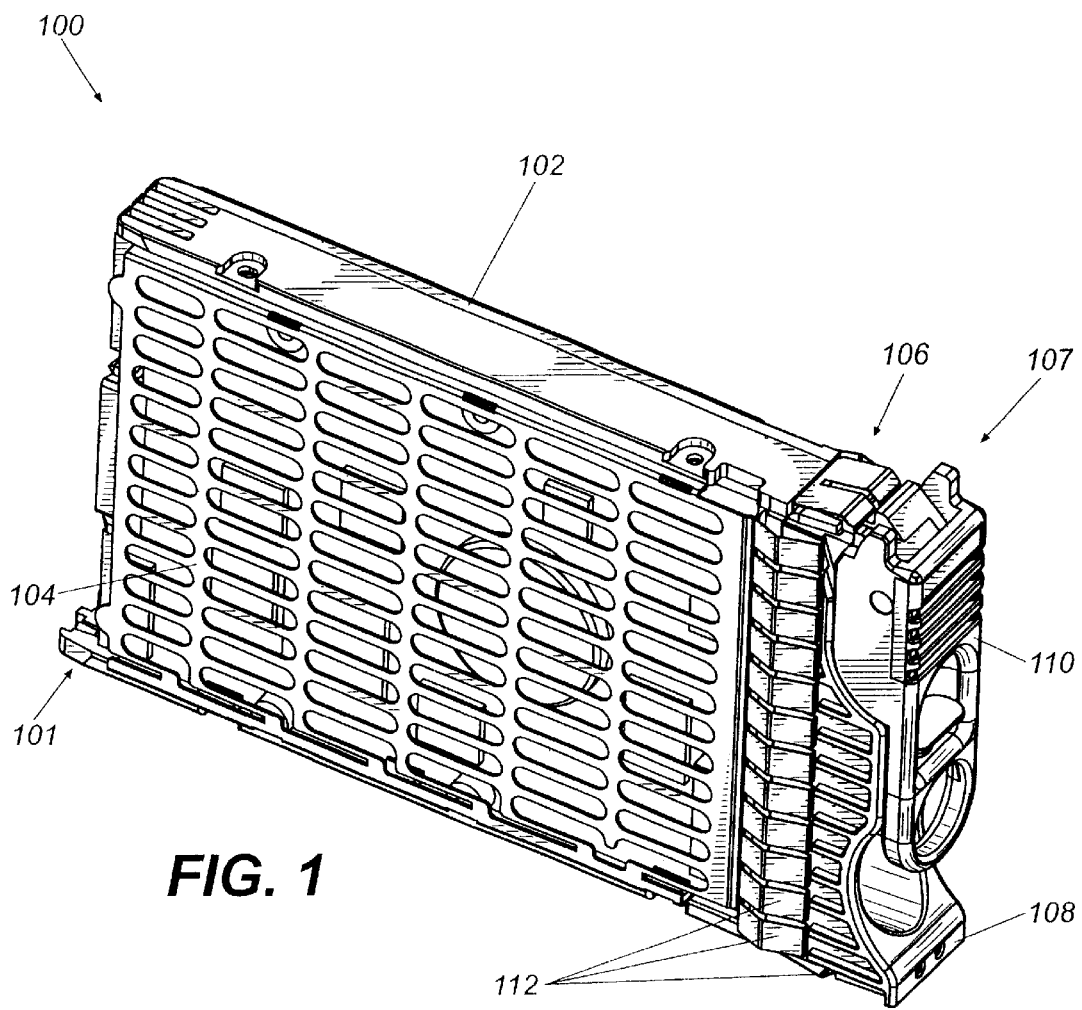
FIG. 1 is a perspective view of a preferred embodiment of a carrier of the present invention.

Reference will now be made in detail to the description of the invention as illustrated in the drawings with like numerals indicating like parts throughout the several views. As shown in FIG. 1, a preferred embodiment of the storage medium carrier 100 of the present invention is configured as a module that is adapted for protecting and/or facilitating mounting of a data storage device, such as a disk drive, for example. The carrier can facilitate mounting of a data storage device to a chassis, which can be configured as an enclosure, a server product, a disk array, etc. Additionally, embodiments of the carrier 100 can be adapted to meet performance requirements of 1" low-profile, 3.5" form factor disk drives, for example. Of course, the invention also can be adapted to meet various other criteria as would be apparent to one of ordinary skill in the art.

As described in greater detail hereinafter, embodiments of the carrier 100 can provide one or more of the following functions: (1) providing cooling of housed data storage device components; (2) providing structural stability to reduce externally and/or internally generated shock and/or vibration dynamics; (3) providing electromagnetic interference (EMI) and/or electrostatic discharge (ESD) control; and (4) improved handling, such as by enabling "hot swap" of the carrier and its associated data storage device between various mounting locations.

The representative embodiment of the carrier 100 depicted in FIG. 1 includes a housing 101, which incorporates a carrier frame 102 and a protective circuit assembly (PCA) cover 104. Frame 102 is sized and shaped for receiving and mounting a data storage device. As used herein, the term "data storage device" refers to any device that is capable of storing data, such as a disk drive, CD ROM, or an atomic resolution storage device, among others. At least partial encasement of such a data storage device within carrier 100 is facilitated by PCA cover 104. PCA cover 104 is adapted to mate with the carrier frame 102. Once so mated, carrier frame 102, PCA cover 104, and a corresponding data storage device cooperate so as to provide a protective enclosure for more sensitive components of the data storage device, such as storage device circuit assembly (not shown). For example, and not for the purpose of limitation, the storage device circuit assembly may be positioned between the PCA cover 104 and an opposing exterior surface of the data storage device.

In addition to providing a protective enclosure for at least a portion of an associated data storage device, in some embodiments, PCA cover 104 can function as a heat sink for the data storage device. In these embodiments, the PCA cover can be formed of a material such as aluminum, for example.

As shown in the embodiment of FIG. 1, carrier 100 includes an EMI shield 106, and a handle assembly 107, which incorporates a carrier bezel 108 and a handle 110. In some embodiments, handle 110 provides the dual functionality of serving as a carrying handle, which may be utilized for repositioning the carrier, and a locking mechanism for facilitating secure mounting of the carrier to an appropriate chassis or other mounting device. Preferably, the EMI shield incorporates spring fingers 112, described in detail hereinafter.

Figure 2:
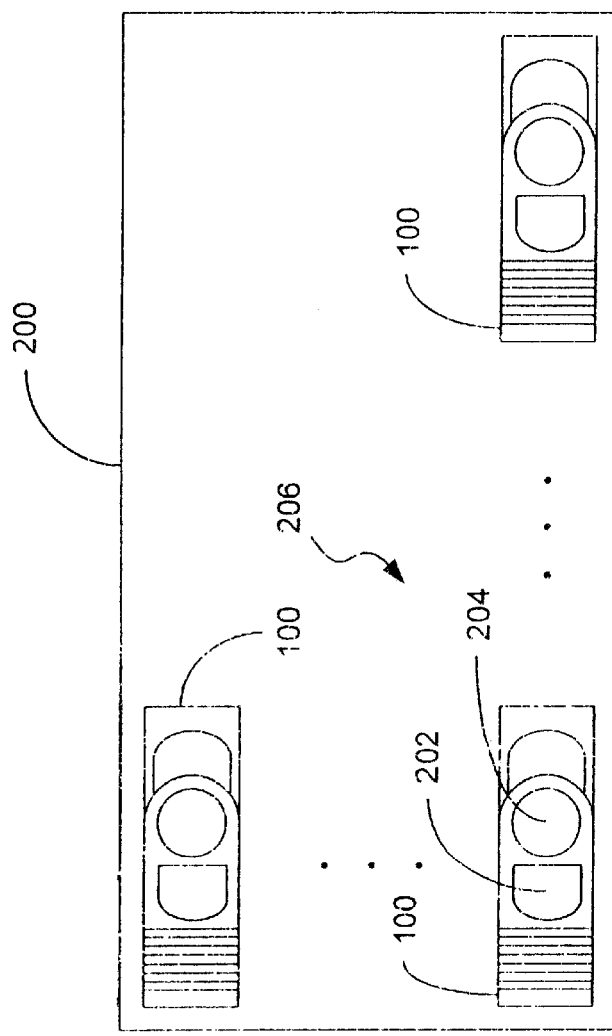
FIG. 2 is a schematic diagram depicting the carrier of FIG. 1 mounted to a representative chassis in a horizontal orientation.

Carrier 100 preferably is adapted to mount within a drive cage or slot of an enclosure. A representative enclosure 200 is depicted schematically in FIG. 2. As shown in FIG. 2, enclosure 200 may facilitate mounting of one or more carriers 100. Typically, mounting of a carrier 100 within enclosure 200 is facilitated by manual insertion of the carrier into an appropriate slot, for example. Insertion and/or removal of the carrier from the appropriate slot may be accomplished without removing power from the carrier. This procedure, commonly referred to as "hot swap," provides a technician with added flexibility as various other slots, and associated data storage device of the slots, do not have to be taken out of service during installation and/or removal of the carrier of interest.

Some embodiments of carrier 100 are provided in a "right-handed" configuration. As utilized herein, the term "right-handed configuration" refers to a carrier configuration that enables a user to conveniently grasp handle 110 with his right hand. This configuration typically is consistent with preferred user-handling.

In regard to carrier 100, the right-handed configuration typically includes providing a bezel opening 202, which is adapted to receive the thumb of the user's right hand, and an opening 204 of the handle, which is adapted to receive another finger of the user's right hand, e.g., an index finger. Preferably, opening 204 is oriented to the right of the bezel opening when the carrier 100 is in a horizontal position, i.e., when PCA cover 104 is in a substantially horizontal plane and is disposed at the bottom side of the carrier.

Figure 3:
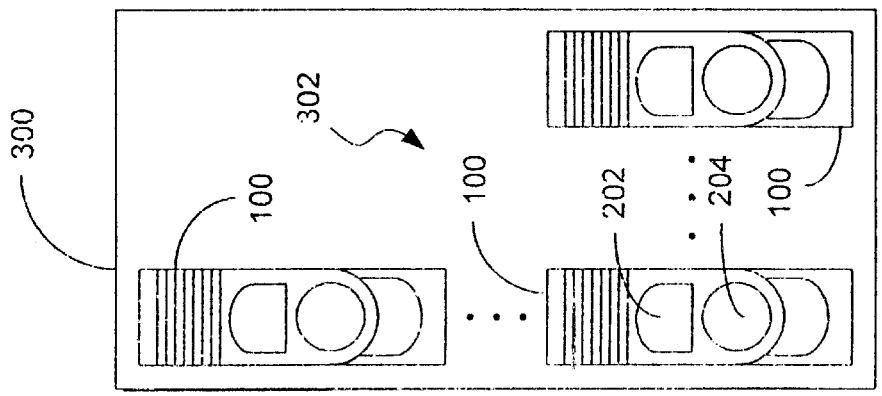
FIG. 3 is a schematic diagram depicting the carrier of FIG. 1 mounted to a representative chassis in a vertical orientation.

As shown in FIG. 2, carrier 100 and its associated data storage device can be arranged in a horizontal mounting position, e.g., position 206. When the carrier is mounted in the horizontal mounting position, the PCA cover 104 generally faces down. In FIG. 3, an alternative enclosure 300 is schematically depicted. Enclosure 300 is configured to receive one or more carriers 100 that are arranged in vertical mounting positions, e.g., position 302. When mounted in the vertical mounting position, bezel opening 202 typically is oriented above opening 204.

Figure 4:
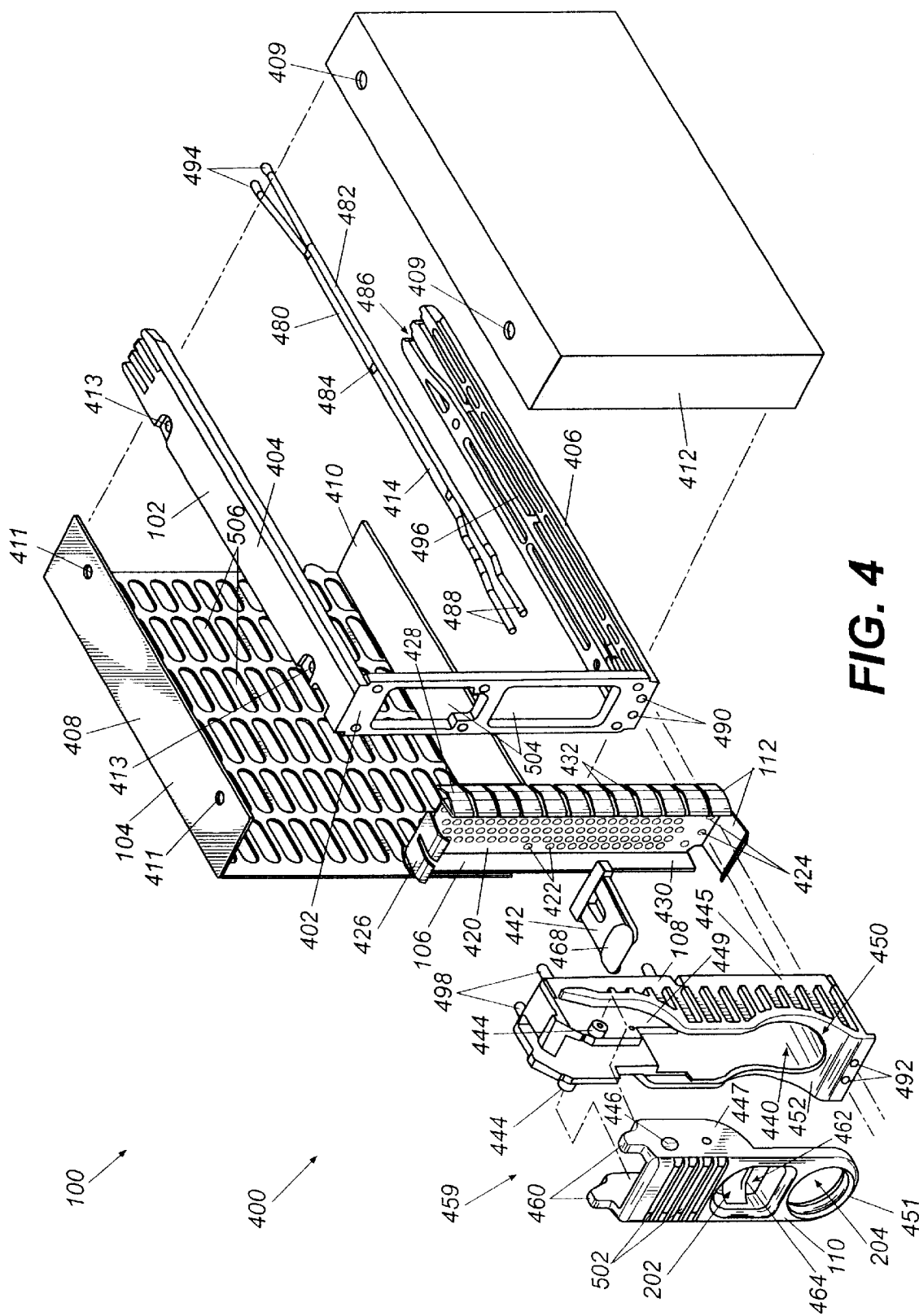
FIG. 4 is a partially-exploded, perspective view of an embodiment of a storage medium module of the present invention, which incorporates a disk drive and the embodiment of the carrier depicted in FIG. 1.

Reference will now be made to FIG. 4 which depicts preferred assembly detail of the embodiment of the carrier 100 depicted in FIG. 1. As shown in FIG. 4, carrier 100 includes frame 102, PCA cover 104, EMI shield 106, bezel 108, and cam handle 110. Frame 102 incorporates a face plate 402 and rails 404 and 406, which extend outwardly from face plate 402. Frame 102 is configured to receive PCA cover 104. By way of example, in the embodiment depicted in FIG. 4, sidewalls 408 and 410 of PCA cover 104 engage between rails 404 and 406, respectively, of frame 102. Sidewalls 408 and 410 are appropriately spaced to receive a data storage device, e.g., a disk drive 412. Thus, the data storage device is received at least partially between sidewalls 408 and 410.

Data storage device 412 and PCA cover 104 preferably are mounted to frame 102 by aligning mounting holes 409 of the data storage device, mounting holes 411 of PCA cover 104, and mounting holes 413 of frame 102. Mechanical fasteners (not shown) then are inserted through the aligned holes. In some embodiments, structural stability of the mounted data storage device 412 is enhanced by a snug fit of device 412 between the sidewalls of the PCA cover. Similarly, a snug fit of the sidewalls of the PCA cover between the rails of frame 102 also may enhance the structural stability of the module. The snug fit of the sidewalls of the PCA cover between the rails of the frame 102 also tends to be promoted by the mechanical fasteners, which draw the rails against the PCA cover as the fasteners are tightened.

Frame 102 is adapted to engage a lightpipe assembly 414, which will be described in detail hereinafter. Additionally, frame 102 and, more specifically, faceplate 402, is adapted to engage EMI shield 106. EMI shield 106 includes a body portion 420 that defines various apertures. In particular, an array of apertures 422 is provided, with the apertures 422 being sized and shaped to impede and/or prevent the propagation of electromagnetic energy from components arranged behind shield 106, e.g., data storage device 412. In some embodiments, apertures 422 each are configured with a hexagonal shape and also provide the function of enabling air to flow through the shield. This configuration tends to promote cooling of the data storage device 412. Body portion 420 also includes apertures 424 that are adapted to facilitate placement and/or viewing of lightpipe assembly 414.

Preferably, spring fingers 112 depend from body portion 420, such as along an outer periphery of the body portion. Various numbers and configurations of spring fingers 112 may be provided. All such numbers and configurations are considered well within the scope of the invention. The spring fingers preferably provide one or more of the following functions: (1) promoting structural stability to reduce externally and/or internally generated shock and/or vibration; (2) promoting electrical grounding continuity between carrier 100 and a component(s) to which it is mounted, and/or other carriers of such a component(s); and (3) enhancing EMI and/or ESD control of the carrier.

Various aspects of enhancing EMI and/or ESD control of a carrier/chassis system are described in detail in co-pending U.S. patent application Ser. No. 09/809,409, entitled "Systems with Enhanced Electrostatic Discharge Protection," filed on Mar. 15, 2001. That application is commonly assigned to the Hewlett-Packard Company and is incorporated herein by reference in its entirety.

In FIG. 4, EMI shield 106 includes both forward-facing spring fingers 426 and rearward-facing spring fingers 428

(forward-facing generally referring to a direction away from data storage device 412, and rearward-facing generally referring to a direction toward device 412). Spring fingers 428 preferably extend from flanges 430, which, in combination with the forward-facing spring fingers 426, are adapted to extend about at least a portion of bezel 108.

EMI shield 106 is formed, at least partially, of an appropriate shielding material, such as stainless steel, among others. EMI shield 106 is formed of an appropriate thickness of material or otherwise is configured so as to provide suitable flexibility to one or more of the various spring fingers 112. So formed, the spring fingers preferably deflect in response to a displacement force, such as when engaging a corresponding portion of a chassis cage slot, for example. As the spring fingers tend to be biased to their non-displaced positions (shown in FIG. 4), this configuration enables the flexible spring fingers to serve as dampers for damping encountered shock and/or vibration of the carrier. The flexible configuration of the spring fingers also accommodates variable pitch arrangements of multiple carriers. Additionally, slots 432 formed between adjacent ones of the spring fingers may be appropriately sized and shaped for inhibiting propagation of electromagnetic energy beyond the material of the spring fingers.

The structure and accompanying functionality of bezel 108 and cam handle 110 will now be described. As shown in FIG. 4, bezel 108 defines an interior cavity 440 that is adapted to receive a thumb latch 442 (described hereinafter). Pivot bosses 444 are adapted to be received within corresponding pivot holes 446 of cam handle 110. Pivot bosses 444 preferably are provided on sidewalls 445 of the bezel, with pivot holes 446 preferably being formed through sidewalls 447 of the cam handle. Engagement of the bosses 444 within the holes 446 permits pivoting of cam handle 110 about the bosses 444 between an open or unlatched position (not shown) and a closed or latched position 501 (depicted in FIG. 5).

As shown in FIG. 4, each of bezel sidewalls 445 preferably incorporates a recessed portion 449 that is adapted to facilitate seating of the cam handle sidewalls 447 when the cam handle is in the latched position. In the embodiment depicted in FIG. 4, the surface defining each bezel sidewall recessed portion 449 extends to form a contoured profile of the bezel that provides appropriate clearance between the bezel and portions of the cam handle during pivoting of the cam handle. This feature also may be seen in FIG. 5, for example.

Bezel 108 preferably includes a recessed portion 450 that is adapted to provide clearance between the distal end 451 of the cam handle and the face 452 of the bezel. This recessed portion enables a finger of a user to be inserted between the distal end of the cam handle and the bezel so as to facilitate grasping and pivoting of the cam handle.

In order to facilitate mounting of carrier 100 into a corresponding chassis cage slot, for example, cam handle 110 incorporates a latching mechanism 459, which can be configured as one or more cam latches 460. In a preferred embodiment, dual cam latches 460 are provided, with each of the latches extending generally upwardly from a sidewall 447 of the cam handle. Cam latches 460 facilitate mounting of the carrier 100 by engaging a corresponding latching surface, such as representative latching surface 510, depicted in FIG. 5. Preferably, spacing of the cam latches from each other is sufficient to enable nesting of the cam latches about a rail of an adjacently disposed carrier. Thus, line-to-line stacking of carriers can be accommodated in some embodiments.

As mentioned hereinbefore, bezel 108 receives thumb latch 442. As depicted in FIG. 6, thumb latch 442 is received by bezel 108 by positioning base 602 of the latch within corresponding notches 604 of the bezel. Once so positioned, a protrusion 606 extends through bezel opening 440 and, thus, is appropriately positioned to be received within slot 462 of the cam handle (FIG. 4). In operation, as cam handle 110 is pivoted from the unlatched position to the latched position (depicted in FIG. 5), protrusion 606 is received within slot 462. Thereafter, further rotation of the cam handle toward the latched position causes protrusion 606 to be downwardly deflected until lip 464 of the cam handle extends beyond ledge 468 of the latching member. The downwardly deflected protrusion 606 returns to its unbiased position, thereby forming an interference fit between lip 464 and protrusion 606. The aforementioned interference fit tends to maintain the cam handle in the latched position.

Rotation of the cam handle from the latched position to the unlatched position preferably is facilitated by the user extending a thumb, for example, into opening 202 of the cam handle. The thumb then engages thumb latch 442 and downwardly deflects latching member 606 until the interference fit is disengaged. Thereafter, the cam handle may be rotated toward its unlatched position. This can be accomplished by the user inserting another finger, e.g., an index finger, into opening 204 and grasping the cam handle between the thumb and finger.

Various openings are provided within and through the carrier to promote cooling of a data storage device. For instance, cam handle 110 includes one or more louvers 502 that, in addition to the thumb opening 202 and finger opening 204, are adapted to permit air to flow through the handle. Once passing through the handle, air can flow through cavity 440 of the bezel, and then through the various apertures 422 of the EMI shield 106. After passing through the EMI shield, air can reach data storage device 412 by passing through one or more frame openings 504. Airflow toward and away from the data storage device also is provided by apertures 506 formed through the PCA cover 104. Various materials for promoting cooling of heat-producing components and/or protecting a user from such components may be utilized.

Lightpipe assembly 414 will now be described in greater detail. Lightpipe assembly 414 preferably includes two lightpipes, lightpipes 480 and 482, respectively, that are interconnected by one or more cross ties 484. It should be noted that various other numbers of lightpipes may be utilized in other embodiments, with all such numbers being considered well within the scope of the present invention.

The preferred configuration depicted in FIG. 4 enables lightpipe assembly 414 to be assembled during a single molding operation. In particular, lightpipe assembly 414 can be formed by pouring material into a suitable mold to form both lightpipes and their accompanying cross ties as a unitary structure.

Lightpipe assembly 414 is received within a channel arrangement (pocket) 486 that is formed within a rail of frame 102. Once received within pocket 486, viewing ends 488 of the lightpipes may be viewable and/or extend at least partially through holes 490 of frame 102, holes 424 of EMI shield 106, and holes 492 of bezel 108. So provided, status light information typically provided by one or more light emitting diodes (LEDs) associated with the cage slot of a chassis may be propagated to the user for viewing.

In order to increase the chance for light emitted from the aforementioned LEDs (not shown) to enter the lightpipes, light acceptance cones 494 may be provided at the LED ends of the lightpipes. As the cones have an increased cross-sectional surface area at their distal ends, as compared to the cross-sectional surface area of the cylindrical-shaped portions of the lightpipes, minor misalignment of the lightpipes with the LEDs of the cage slot may be accommodated. Thus, this configuration preferably enables a sufficient amount of light from the LEDs to be propagated through the lightpipes for viewing.

In order to keep lightpipe-to-lightpipe crosstalk to negligible visibility levels, an incident light separator 496 preferably is disposed within the pocket 486. Separator 496 forms a physical partition between the lightpipes that is able to reduce the tendency of and/or prevent incident light from propagating between the lightpipes. At locations where the separator is not present, such as at occurrences of cross ties 484, for example, crosstalk between the lightpipes can be reduced by providing the cross ties with a surface texture that promotes scattering of light. For instance, if the cross ties are configured with a non-smooth surface texture, light provided to the cross ties can tend to scatter and not propagate at full intensity from one lightpipe to the other via the cross ties.

Figure 7:
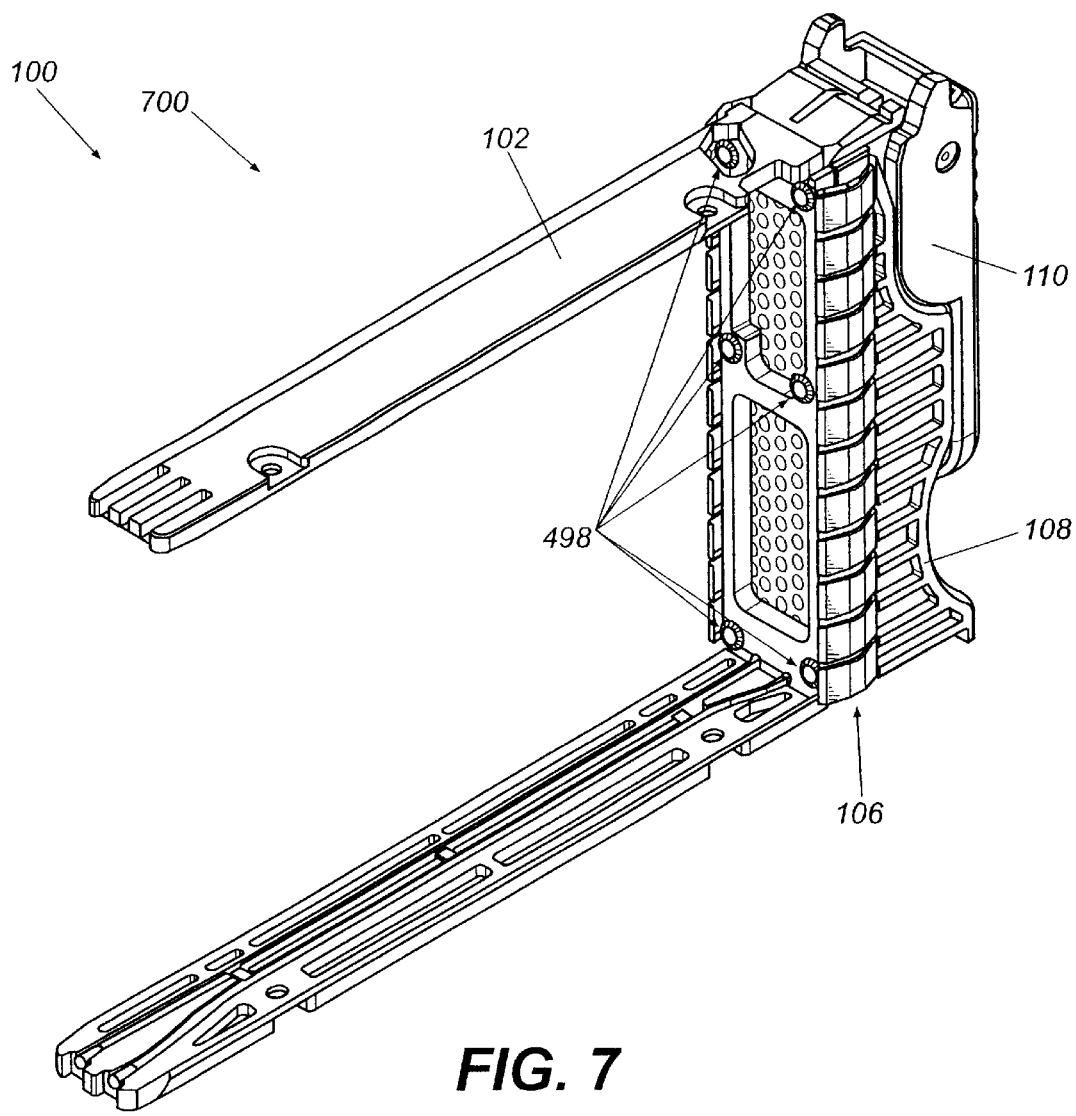
FIG. 7 is a perspective view of the carrier depicted in FIG. 1, showing the frame, EMI shield, bezel, and cam handle in an assembled configuration.

As depicted in FIG. 7 (and with continued reference to FIG. 4), frame 102, EMI shield 106, bezel 108, and cam handle 110 may be assembled to form a carrier assembly 700. More specifically, pivot holes 446 of carrier handle 110 may be received about bosses 444 of bezel 108, and the EMI shield is engaged between the bezel and the frame. In FIG. 7, pins 498 of the bezel may be received within corresponding holes of the EMI shield and frame 102. Thereafter, pins 498 may be substantially prevented from being extracted from the aforementioned holes, such as by heat staking the ends of the pins, thereby securing the frame, EMI shield, bezel, and cam handle together.

Figure 8:
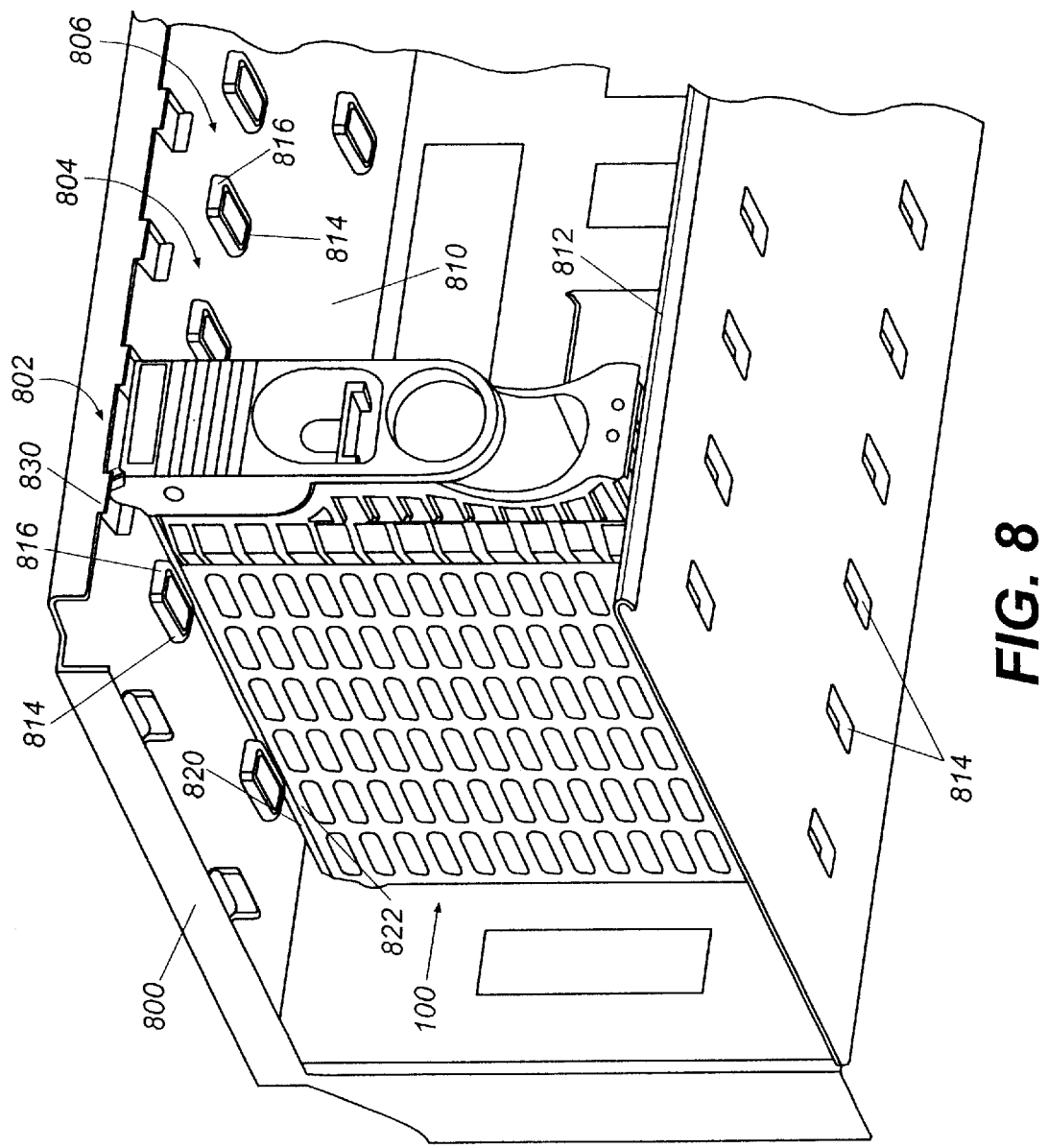
FIG. 8 is a cut-away, perspective view of a preferred embodiment of a chassis of the present invention that is configured to mount one or more carriers in a vertical orientation.

Referring now to FIG. 8, mounting of a carrier 100 to a representative chassis will be described. In FIG. 8, chassis 800 defines multiple slots, e.g., slots 802, 804 and 806, which can accommodate a carrier 100. A carrier 100 is depicted mounted within slot 802 in a vertical mounting position. Slot 802 is defined, at least in part, by an upper wall 810 and a lower wall 812. The walls are spaced from each other at a distance that is sufficient to receive carrier 100. Protrusions 814, some of which extend downwardly from upper wall 810 while others extend upwardly from lower wall 812, are configured to function as alignment guides for the carrier. More specifically, protrusions 814 are configured to engage one or more surfaces of the carrier and tend to align the carrier with its slot as the carrier is slid into the slot. In the embodiment of FIG. 8, protrusions 814 include generally rounded, or otherwise angled, front surfaces 816 that tend to deflect a misaligned carrier toward a proper mounting position. The protrusions, which may be configured to engage various surface of a carrier, preferably engage reveal 820. Reveal 820 is defined where the upper portion 822 and lower portion (not shown) of the PCA cover 104 engage the frame rails.

In order to mount the carrier within slot 802, the handle preferably is pivoted to its unlatched position. The carrier is aligned with the slot and inserted rearwardly into the slot. The protrusions 814 preferably align the carrier and permit the carrier to be slid into the chassis to a sufficient depth to enable the cam latches of the handle to pass beyond a latching surface provided by the chassis. In some embodiments, such a latching surface can be formed by a protrusion 830 arranged in the upper wall of the chassis. Once inserted to an appropriate depth, the handle can be pivoted to its latched position so that the cam latches engage the latching surface(s). This secures the carrier within the slot.

Figure 9:
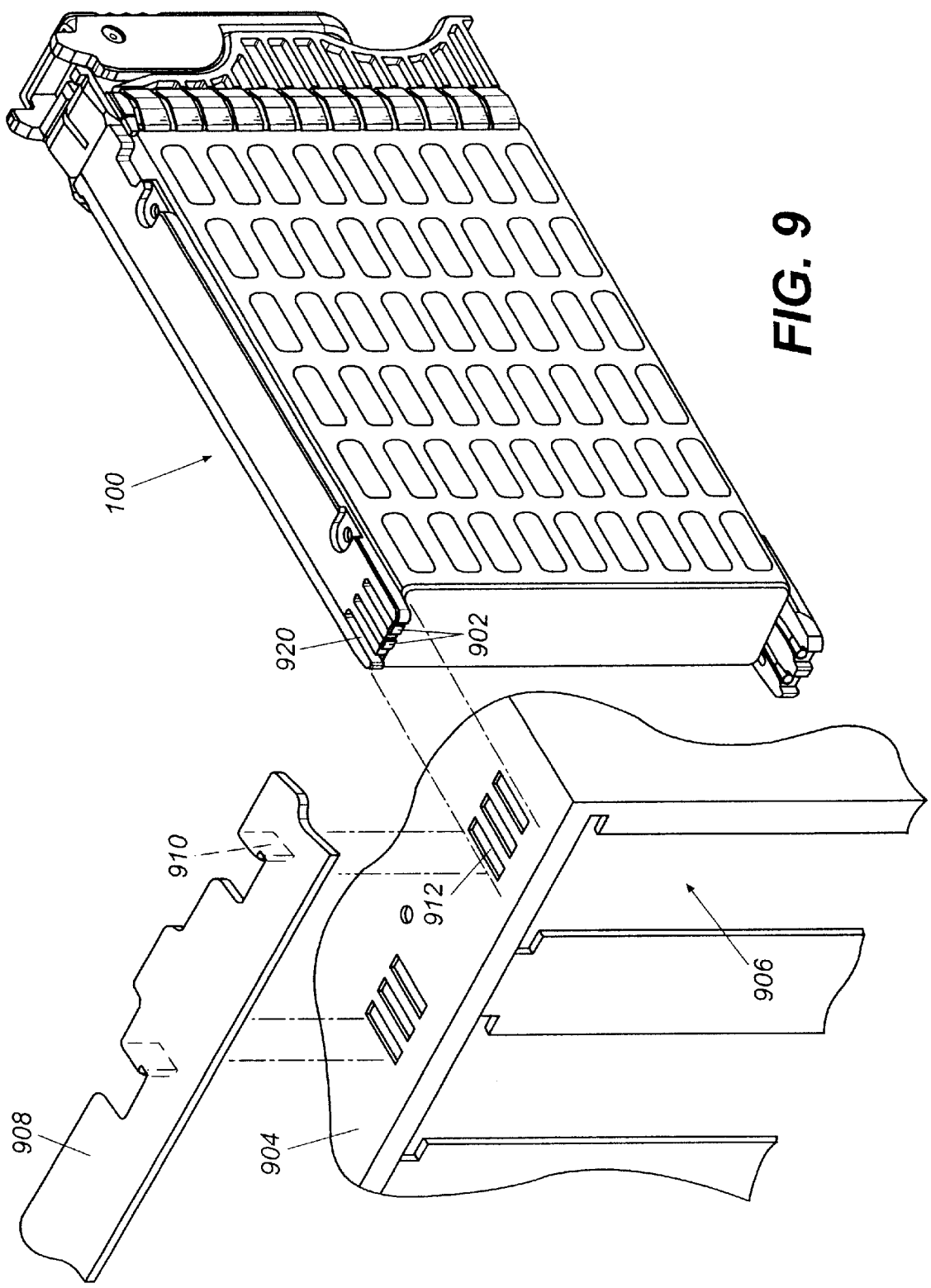
FIG. 9 is a partially exploded, partially cut-away, perspective view of an embodiment of a chassis and carrier, showing detail of the blocking tabs.
Figure 10:
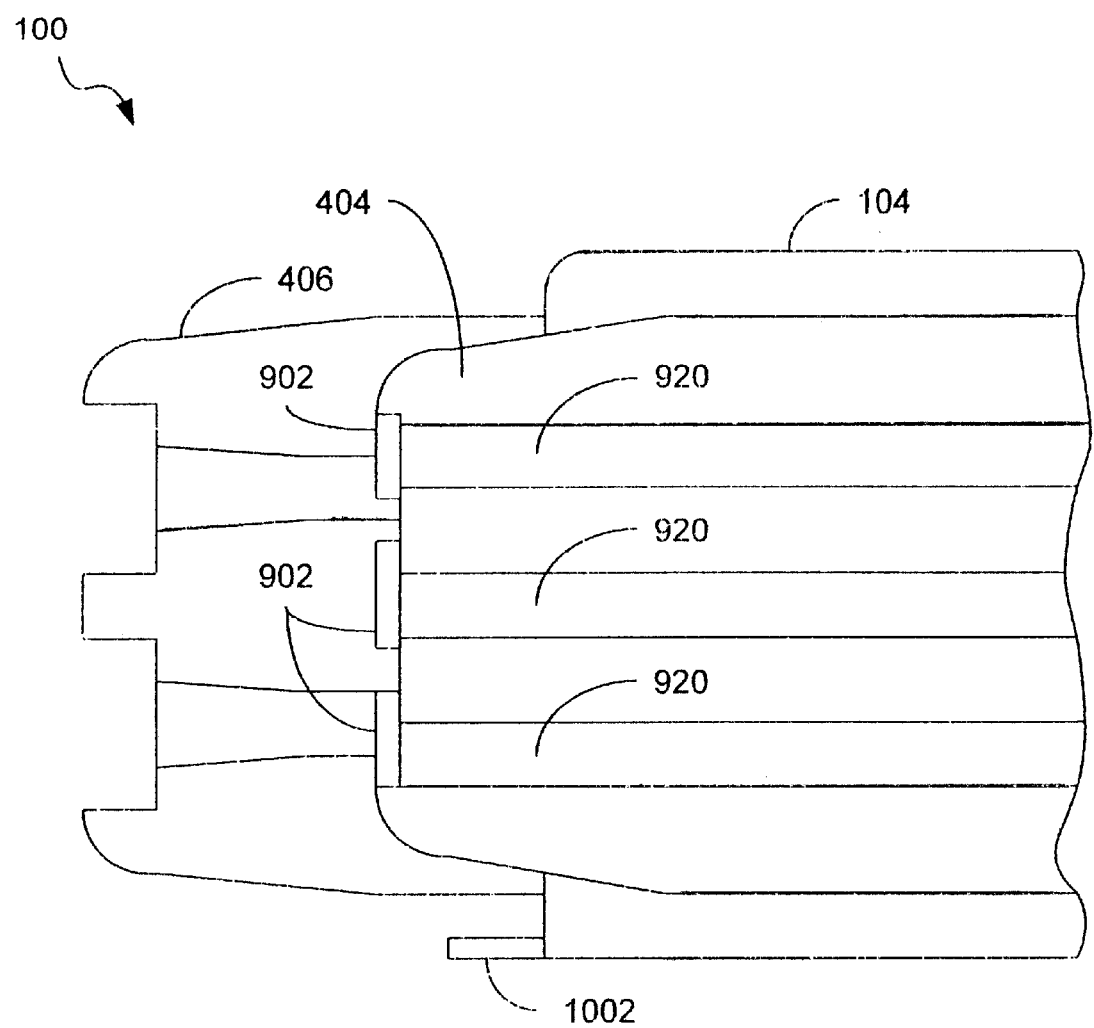
FIG. 10 is a cut-away, plan view of the carrier of FIG. 1, showing assembly detail of the lightpipes.

In order to avoid potential damage during mounting, e.g., damage to interface connectors of the data storage device mounted to a carrier 100 and/or the interface connectors to which the data storage device is to be interconnected, carrier 100 preferably incorporates one or more blocking tabs 902 (FIGS. 9 and 10). Blocking tabs 902 are configured to interfere with a corresponding key of the chassis if the interface connectors of the data storage device and the chassis are not adapted to mate with each other. For example, as depicted in FIG. 9, chassis 904 defines a slot 906 that is to receive carrier 100. Chassis 904 is configured to engage a blocking assembly 908 so that one or more keys 910 of the blocking assembly can protrude into slot 906. In FIG. 9, multiple key holes 912 are formed through the chassis at each slot so that key(s) 910 can extend downwardly through the hole(s) and into their respective slots. In other embodiments, various other configurations of blocking assemblies and/or keys can be utilized. For instance, more than one key per slot could be used in some embodiments.

In order to enable mounting of carrier 100 within slot 906, the blocking tab of the carrier corresponding to the key location is removed. Once so removed, the protruding key can be received within a key channel of the rail. More specifically, key 910 can be received by channel 920. If, however, the blocking tab corresponding to the protruding key is not removed, the key preferably prevents the carrier from being inserted farther within the slot. A more detailed view of representative blocking tabs is depicted in FIG. 10.

In FIG. 10, note that rail 406 is longer than rail 404. Since rail 406 is longer than rail 404, rail 406 can serve as a first contact point between the carrier and the chassis. In particular, the end of rail 406, which extends beyond the end of rail 404, typically would be the first portion of the carrier to contact the chassis during insertion of the carrier into the chassis. In some embodiments, this configuration can permit controlled dissipation of static charge of the carrier and/or chassis associated with the carrier. More specifically, rail 406 can be formed, at least partially, of dissipative material, e.g., a material that is configured to provide a controlled discharge rate of an electrostatic charge of the carrier.

Electro-static discharge ("ESD") can cause relatively high peak currents and resulting fields that can damage or, otherwise, hinder the operability of associated electronic components. In order to reduce the tendency of a potentially damaging ESD event to occur, such as during hot-plugging and/or swapping of a carrier 100, the carrier can be at least partially formed of a dissipative material. As utilized herein, the terms "hot-plugging" and "hot-swapping" refer to the operation of inserting a carrier into and/or removing a carrier from a corresponding chassis while power is operatively applied. The use of dissipative material can prevent metal of the carrier from approaching close enough to the chassis to prompt an ESD event until any charge of the carrier and/or chassis has been sufficiently dissipated.

A dissipative material, such as a conductive plastic, for example, may be used. Such a material can be particularly selected with electrical properties that, in combination with the configuration of the carrier and/or chassis, are intended to avoid electrical arcing between the carrier and the chassis. Noryl HMC1010, by GE Plastics, is a representative example of a suitable conductive plastic.

Dissipative material typically includes a base material, e.g., plastic, and a conductive fill material, such as graphite, for example. Various other base materials and fill materials, however, may be utilized. In some embodiments, the dissipative material may include approximately 10%–20% fill by weight. The amount of fill utilized will, of course, vary depending upon the particular application and requisite mechanical and electrical properties of the material. For instance, one practical upper limit on the amount of fill to be utilized is imposed when the mechanical properties of the material become unsuitable for their intended use. Moreover, one practical lower limit on the amount of fill to be utilized is imposed when the lack of conductivity provided by the material results in metal-to-metal arcing of the charge of the carrier. More specifically, if the resistivity of the material is too high, the charge may not sufficiently dissipate via the material as the carrier approaches the chassis.

Also shown in FIG. 10 is a bumper pad mounting surface 1002 of the PCA cover 104 that is adapted to receive a bumper pad (not shown). Various numbers of pad mounting surfaces 1002 and pads may be provided to facilitate improved shock resistance, for example, of the carrier. In order to accommodate an increased density of carriers within an enclosure, the pads may be removed, thereby yielding a carrier with a decreased profile.

Figure 11:
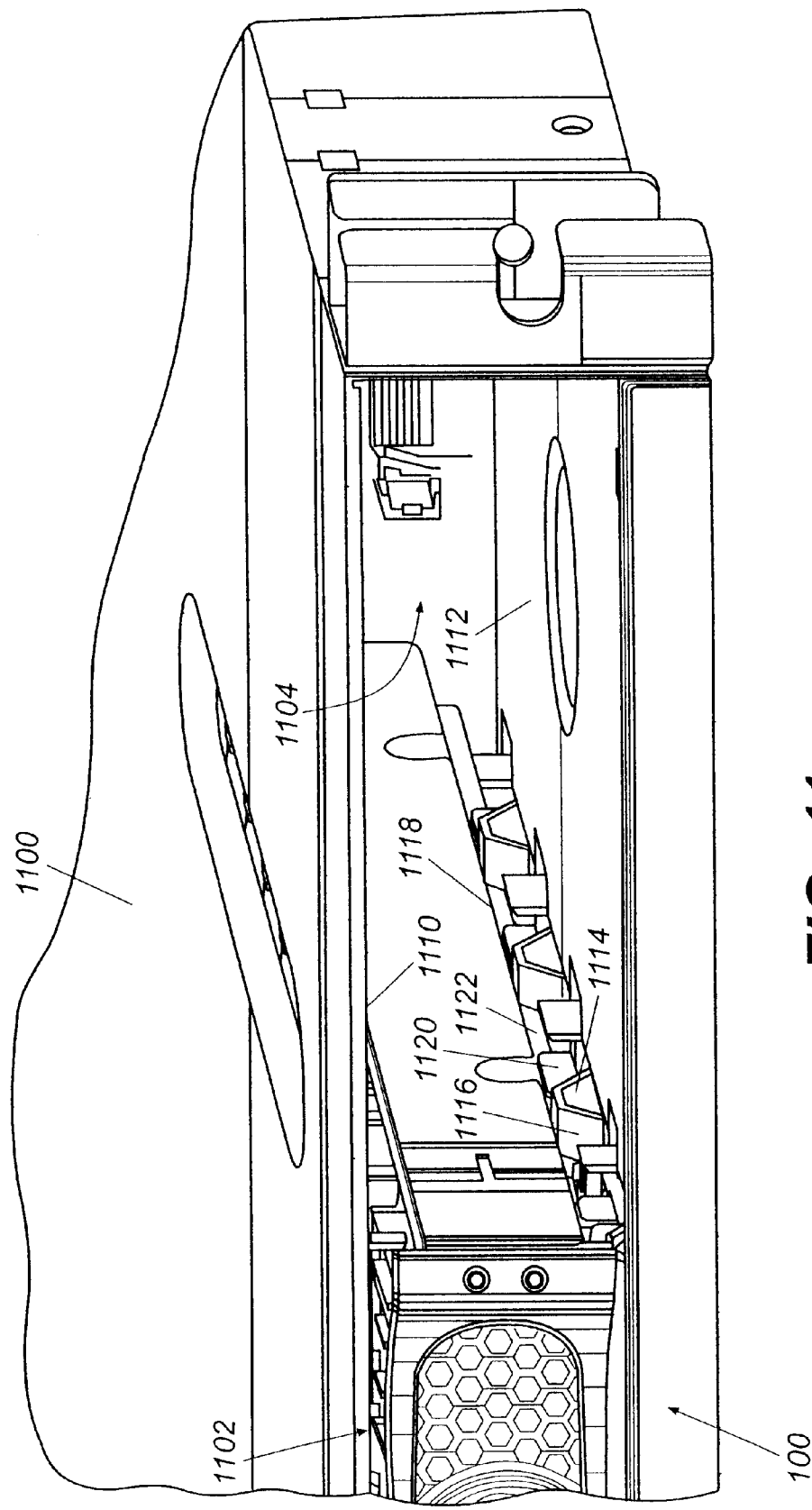
FIG. 11 is a cut-away, perspective view of an alternative embodiment of a chassis of the present invention that is configured to mount one or more carriers in a horizontal orientation.

In FIG. 11, a carrier 100 is shown mounted to another representative chassis. Chassis 1100 of FIG. 11 defines multiple slots, e.g., slots 1102 and 1104, each of which can accommodate a carrier 100. A carrier 100 is depicted mounted within slot 1102 in a horizontal mounting position. Slot 1102 is defined, at least in part, by an upper wall 1110 and a lower wall 1112. The walls are spaced from each other at a distance that is sufficient to receive carrier 100. Protrusions 1114, some of which can extend downwardly from upper wall 1110 while others extend upwardly from lower wall 1112, are configured to function as alignment guides for the carrier. More specifically, protrusions 1114 are configured to engage one or more surfaces of the carrier and tend to align the carrier with its slot as the carrier is slid into the slot. Protrusions 1114 can include generally rounded, or otherwise angled, front surfaces 1116 that tend to deflect a misaligned carrier toward a proper mounting position. The protrusions, which may be configured to engage various surface of a carrier, preferably engage side edges of the rails, such as edge 1118 of rail 404.

Also provided are protrusions 1120, some of which can extend downwardly from upper wall 1110 while others extend upwardly from lower wall 1112. Protrusions 1120 are configured to function as supports for the carrier. These protrusions, which also may be configured to engage various surface of a carrier, preferably engage sides of the PCA cover, such as side 1122.

In order to mount the carrier within slot 1102, the handle preferably is pivoted to its unlatched position. The carrier is aligned with the slot and inserted rearwardly into the slot. The protrusions 1114 and 1120 preferably align and support the carrier and permit the carrier to be slid into the chassis to a sufficient depth to enable the cam latches of the handle to pass beyond a latching surface provided by the chassis. In some embodiments, such a latching surface can be formed by a protrusion 1114 and/or a protrusion 1120. Once inserted to an appropriate depth, the handle can be pivoted to its latched position so that the cam latches engage the latching surface(s). This secures the carrier within its slot.

Figure 12:
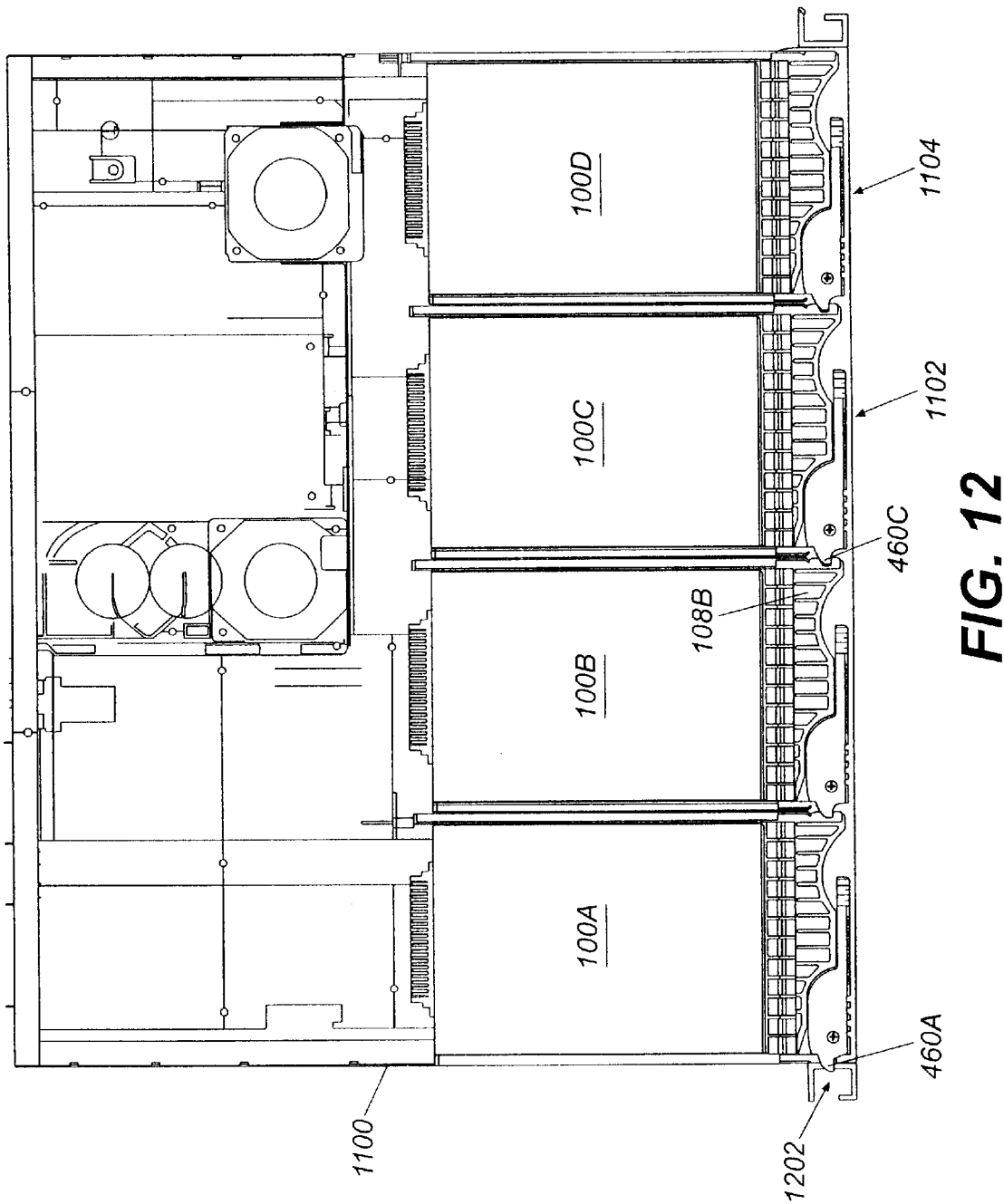
FIG. 12 is a cross-sectional, plan view of the chassis of FIG. 11.

As depicted in FIG. 12, multiple carriers, e.g., carriers 100A, 100B, 100C, and 100D, can be arranged in a top-to-bottom relationship within a chassis. In order to facilitate a relatively high carrier density, cam latches of one carrier, e.g., carrier 100C, can be configured to engage about a portion of an adjacent carrier, e.g., carrier 100B. For example, cam latches 460C are spaced from each other so as to enable a portion of bezel 108B to be received between the cam latches. Also depicted in FIG. 12 is aperture 1202, which is configured to receive cam latches 460A.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A system for mounting a data storage device to a chassis, said system comprising:

a carrier having a housing and a handle assembly, said housing being configured to receive at least a portion of a data storage device, said handle assembly having a handle configured to move between a latched position and an unlatched position such that, in said latched position, said handle facilitates secure mounting of said carrier to a chassis, and in said unlatched position, said handle facilitates removal of said carrier from the chassis;

wherein said carrier has a shield at least partially disposed between said housing and said handle assembly, said shield being configured to inhibit propagation of electromagnetic energy directed from the data storage device and said shield.

2. The system of claim 1, wherein said housing has a frame, said frame engaging said shield, said frame having a faceplate, a first rail, and a second rail, said first rail and said second rail extending from said faceplate, said first rail and second rail being configured to engage opposing sides of a data storage device received by said housing.

3. The system of claim 1, wherein said housing has a cover, said cover being configured to at least partially encase a data storage device received by said housing.

4. The system of claim 1, wherein said handle has a latching mechanism, said latching mechanism being configured to engage a latching surface of a chassis such that, when said carrier is received by a chassis and said handle is moved to said latched position, engagement of said latching mechanism with the latching surface substantially prevents said carrier from being removed from the chassis.

5. The system of claim 1, further comprising:

a chassis configured to mount at least one data storage device.

6. The system of claim 5, wherein said housing has a cover, said cover having a substantially planar body portion and a sidewall extending therefrom, said cover being configured to at least partially encase a data storage device received by said housing, said carrier and said chassis being configured to engage each other such that said body portion of said cover is aligned in a substantially horizontal plane when said carrier is mounted to said chassis.

7. The system of claim 5, wherein said housing has a cover, said cover having a substantially planar body portion and a sidewall extending therefrom, said cover being configured to at least partially encase a data storage device received by said housing, said carrier and said chassis being configured to engage each other such that said body portion of said cover is aligned in a substantially vertical plane when said carrier is mounted to said chassis.

8. The system of claim 5, further comprising:
a data storage device received at least partially within said housing of said carrier.

9. The system of claim 5, wherein said carrier has a blocking tab, and wherein said chassis has a key, said key being configured to engage said blocking tab and prevent said carrier from being mounted to said chassis when said key engages said blocking tab, said blocking tab being configured to be at least partially removed from said carrier such that said key enables said carrier to mount to said chassis.

10. The system of claim 5, further comprising:
means for selectively preventing said carrier from being mounted to said chassis.

11. The system of claim 5, further comprising:
means for inhibiting propagation of electromagnetic energy directed from the data storage device.

12. The system of claim 5, further comprising:
means for damping vibration encountered by said carrier.

13. The system of claim 5, further comprising:
means for retaining said handle in said latched position.

14. A system for mounting a data storage device to a chassis, said system comprising:
a carrier having a housing and a handle assembly, said housing being configured to receive at least a portion of a data storage device, said handle assembly having a handle configured to move between a latched position and an unlatched position such that, in said latched position, said handle facilitates secure mounting of said carrier to a chassis, and in said unlatched position, said handle facilitates removal of said carrier from the chassis; and
wherein said carrier has spring fingers arranged at least partially between said handle assembly and said housing, each of said spring fingers being configured as a flexible member, said spring fingers being spaced from each other and protruding about at least a portion of the periphery of said carrier, each of said spring fingers being configured to deflect from a non-displaced position in response to a displacement force such that said spring fingers tend to damp vibration encountered by said carrier.

15. A system for mounting a data storage device to a chassis, said system comprising:
a carrier having a housing and a handle assembly, said housing being configured to receive at least a portion of a data storage device, said handle assembly having a handle configured to move between a latched position and an unlatched position such that, in said latched position, said handle facilitates secure mounting of said carrier to a chassis, and in said unlatched position, said handle facilitates removal of said carrier from the chassis; and
wherein said handle assembly has bezel, said bezel having a first pivot boss and a second pivot boss, and wherein said handle has first pivot hole boss and a second pivot hole, said first pivot boss being received within said first pivot hole, said second pivot boss being received within said second pivot hole such that said handle pivots between said latched and said unlatched positions.

16. The system of claim 15, wherein said handle assembly has a first cam latch and a second cam latch, said first cam latch and said second cam latch being configured as protruding members of said handle, said first cam latch and said second cam latch being arranged such that, when said carrier is received by a chassis and said handle is moved to said latched position, said first cam latch and said second cam latch rotate relative to said first pivot boss and said second pivot boss to engage a latching surface of the chassis, thereby substantially preventing said carrier from being removed from the chassis.

17. The system of claim 15, wherein said handle has a first sidewall and a second sidewall, said first sidewall and said second sidewall being configured to be received about at least a portion of said bezel when in said latched position, said bezel defining a first recess and a second recess, said first recess being configured to receive at least a portion of said first sidewall of said handle, said second recess being configured to receive at least a portion of said second sidewall of said handle.

18. The system of claim 15, wherein said handle has a first opening formed therethrough, and wherein said handle assembly has a thumb latch, said thumb latch being configured to engage said handle in an interference fit to substantially retain said handle in said latched position, said first opening being configured to receive a finger of an operator such that, when said handle is to be moved from said latched position to said unlatched position, the operator can insert a finger into said first opening, deflect said thumb latch from engagement with said handle, an move said handle to said unlatched position.

19. The system of claim 16, wherein said carrier has a lightpipe assembly, and wherein said first rail defines a channel arrangement, said lightpipe assembly being at least partially received within said channel arrangement, said lightpipe assembly being configured to propagate light along a length thereof.

20. The system of claim 16, wherein said first cam latch and said second cam latch are spaced from each other at a distance sufficient to permit placement of a portion of an adjacently disposed second carrier between said first cam latch and said second cam latch.

21. The system of claim 19, wherein said lightpipe assembly has a first lightpipe, a second lightpipe, and a cross tie, said first lightpipe and said second lightpipe being interconnected by said cross tie, said cross tie being integrally formed with said first lightpipe and said second lightpipe such that said first lightpipe, said second lightpipe, and said first cross tie form a unitary structure.

22. The system of claim 19, wherein said lightpipe assembly has a first lightpipe and a light acceptance cone, said first lightpipe having a first end and a second end, said first lightpipe having a substantially uniform diameter along a length thereof from said first end to said second end, said light acceptance cone engaging said first end of said first light pipe, said light acceptance cone exhibiting a substantially conical shape such that said light acceptance cone increases in diameter along a length thereof from said first end.

23. The system of claim 19, wherein said lightpipe assembly has a first lightpipe and a second lightpipe, and wherein said channel arrangement defines a light separator, said light separator being at least partially disposed between said first lightpipe and said second lightpipe such that said light separator reduces crosstalk between said first lightpipe and said second lightpipe.

24. The system of claim 21, wherein said cross tie has an exterior surface, said exterior surface being configured to scatter light directed from one of said first lightpipe and said second lightpipe to the other of said first lightpipe and said second lightpipe such that said cross tie reduces crosstalk between said first lightpipe and said second lightpipe.

* * * * *